W. A. WALKER.
COMBINED RAIL JOINT AND SPIKE PROTECTOR.
APPLICATION FILED MAY 31, 1907.
985,867.
Patented Mar. 7, 1911.
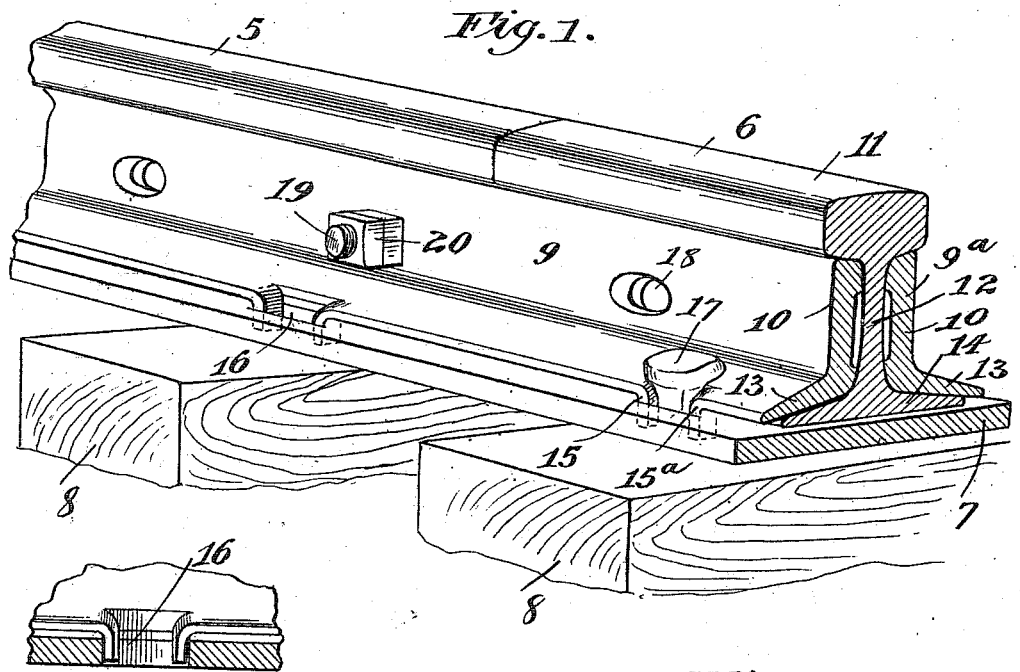
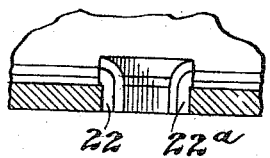
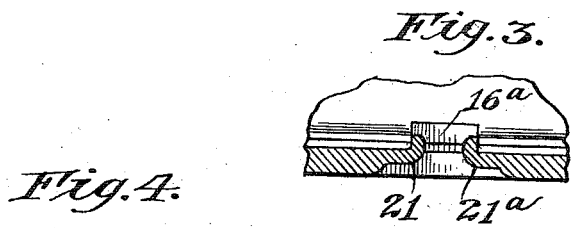
Witnesses,
Inventor,
William A. Walker.
By Offield, Towle and Linthicum
Atty's.

UNITED STATES PATENT OFFICE.

WILLIAM A. WALKER, OF RACINE, WISCONSIN.

COMBINED RAIL-JOINT AND SPIKE-PROTECTOR.

985,867. Specification of Letters Patent. Patented Mar. 7, 1911.

Application filed May 31, 1907. Serial No. 376,721.

*To all whom it may concern:*

Be it known that I, WILLIAM A. WALKER, a citizen of the United States, residing at Racine, in the county of Racine and State of Wisconsin, have invented certain new and useful Improvements in Combined Rail-Joints and Spike-Protectors, of which the following is a specification.

The invention relates to rail joints, and has for its objects to provide a rail joint wherein there can be no longitudinal movement between the two sections of the rail, which the joint secures, and the fish and base plates which secure the rail to the ties, nor will the spikes that hold said members in their proper position be worn, whereby the head of a spike is severed from the main body thereof by the movement of said members. In the common construction, where a rail joint is used, a "creeping" of the rails from various causes results in a relative movement of the fish plates and base plates; and as the parts are generally secured together by bolts, spikes or the like passing through registering apertures in said plates, a sharp surface is presented by the fish plate to the spike, where the spike passes therethrough, which wears the throat of the spike thereby eventually severing the head, and results in a loosening of the rails from the ties. I have discovered that by presenting a rounded or beveled surface at the throat of the spike the severing of its head may be thereby prevented.

The invention consists broadly in interposing members having a rounded beveled or tapered wearing surface between the spikes and the fish plates, and in the accompanying drawing various means are shown for accomplishing the objects of the invention.

Figure 1 is a perspective elevation of a rail joint embodying my invention; Fig. 2 is a sectional detail view of the preferred form; and Figs. 3 and 4 are sectional detail modifications.

Referring now more specifically to the drawings, 5 and 6 are the meeting ends of two rails, and 7 a base plate upon which the rail ends rest, the base plate in turn being seated or resting upon the ties 8. Applied to both sides of the rails are angular fish plates 9 and 9$^a$, the vertical portions 10 of which lie under the treads 11 of the rails and against the webs 12 thereof, while the horizontal portions 13 overlie the bases 14 of the rails and extend outwardly therefrom. On the extended horizontal portion 13 of the fish plates two ears 15 and 15$^a$ are formed, preferably integral with the fish plate, and are bent or swaged downward into an aperture 16 in the base plate 7. These ears 15 and 15$^a$ may be formed in any suitable manner, and in the preferred form they extend downward to approximately the bottom of the base plate 7, their inner sides being in contact with the ends of the aperture 16, thereby preventing any relative longitudinal movement between the fish and base plates. The ears 15 and 15$^a$ must also be spaced apart when bent into the aperture 16 sufficiently to allow a spike 17 to be driven therebetween and through the aperture 16 in the base plate into the tie 8. It may be thus readily seen that when the ears are swaged downward, a rounded surface will be formed which is presented to the throat of the spike, and if any movement occurs between the fish plate and base plate the wear will come upon the ears 15 and 15$^a$ and not upon the spike. In the common practice registering apertures 18 are formed in the fish plates and web adapted to receive bolts 19 having nuts 20 thereon to hold the rail ends together and in perfect alinement, while the ears 15 and 15$^a$ as well as the spikes 17 prevent movement of the fish and base plates relative to each other and to the ties 8, so that all the members are firmly anchored to the ties.

In Figs. 3 and 4 are shown detail modifications of my invention, and in Fig. 3, instead of forming the lips integral with the fish plates, lips 21 and 21$^a$ are formed integral with the base plate and are turned upward into a registering notch or aperture 16$^a$ in the fish plate, the upper ends of the ears being slightly swaged outwardly or rounded so as not to present a sharp surface. In Fig. 4 the lips 22 and 22$^a$ are independent members having rounded surfaces and are interposed on both sides of the spike the same as the lips 15 and 15$^a$. However, Figs. 1 and 2 show the preferred form of construction, as the lips may be formed more easily on the fish plate than on the base plate, the former being thinner than the latter, and it is preferable to have the lips formed integral with one of the members as a matter of cheapness of construction and to facilitate the operation in laying the track.

It is obvious that the object of the invention might be accomplished in various other ways, and that the principle might also be applied to tie-plates and other spike or bolt-receiving members of a railway track, but it is thought that the forms herein shown disclose fully the nature of the invention, and not therefore confining myself to the specific construction shown.

I claim:

1. A fish plate or splice member having spike-receiving holes in its base, each transverse face of the holes having a continuous metallic engaging surface of greater depth than the thickness of the plate base.

2. A fish plate having spike-receiving holes formed therein, the transverse sides of said holes being formed by integral ears struck from the metal of the fish plate and presenting a rounded surface or surfaces to the throat of the spike, substantially as described.

3. A fish plate having spike-receiving holes formed therein, one of the transverse sides of said holes being formed by integral ears struck downwardly from the metal of the fish plate through said hole and presenting rounded surfaces to the throat of the spike, substantially as described.

4. A rail joint comprising a base plate situated beneath the bases of continuous rail sections, and formed with apertures extending vertically therethrough, and fish plates having ears formed integral therewith adapted to be bent into said apertures whereby a spike may be driven between said ears into a tie for the purposes described, substantially as described.

5. A rail joint comprising a base member situated beneath the bases of continuous rail sections, and formed with apertures extending vertically therethrough, in combination with fish plate members, one of said members having ears formed integral therewith adapted to be bent into said apertures whereby a spike may be driven between said ears into a tie for the purposes described, substantially as described.

6. A rail joint comprising a base member situated beneath the bases of continuous rail sections, in combination with fish plate members, one of said members provided with apertures extending vertically therethrough, and the other of said members having ears formed integral therewith and adapted to be bent into said apertures whereby a spike may be driven between said ears into a tie for the purposes described, substantially as described.

WILLIAM A. WALKER.

Witnesses:
C. R. CARPENTER,
CORA H. PHILLIPS.